(12) United States Patent  
Saitoh et al.

(10) Patent No.: US 7,364,176 B2  
(45) Date of Patent: Apr. 29, 2008

(54) VEHICULAR ANTI-VIBRATION STRUCTURE

(75) Inventors: Hiroyuki Saitoh, Saitama (JP); Yoshihiro Katagiri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 10/923,812

(22) Filed: Aug. 24, 2004

(65) Prior Publication Data

US 2005/0051987 A1 Mar. 10, 2005

(30) Foreign Application Priority Data

Sep. 8, 2003 (JP) ............................ P2003-315852

(51) Int. Cl.  
*B60G 7/00* (2006.01)

(52) U.S. Cl. .................. 280/124.13; 280/124.134; 280/124.169; 267/292; 267/140.12

(58) Field of Classification Search ............ 280/5.5, 280/5.516, 5.523, 5.524, 124.134, 124.135, 280/124.136, 124.144, 124.13, 124.169; 267/292, 293, 140.12, 140.2, 141.2

See application file for complete search history.

(56) References Cited

U.S. PATENT DOCUMENTS

| | | | | |
|---|---|---|---|---|
| 4,634,108 A | * | 1/1987 | Munch | 267/279 |
| 4,807,901 A | * | 2/1989 | Kondo | 280/5.524 |
| 4,810,004 A | * | 3/1989 | Kanai et al. | 280/124.144 |
| 4,865,350 A | * | 9/1989 | Yamamoto | 180/359 |
| 4,998,748 A | * | 3/1991 | Kashiwagi et al. | 280/5.524 |
| 5,213,313 A | * | 5/1993 | Tsutsumida et al. | 267/140.12 |
| 5,362,091 A | * | 11/1994 | Lee | 280/124.109 |
| 5,362,093 A | * | 11/1994 | Klosterhuber et al. | 280/124.136 |
| 5,692,767 A | * | 12/1997 | Kato | 280/124.142 |
| 5,954,317 A | * | 9/1999 | Meyer et al. | 267/140.12 |
| 2006/0186628 A1 | * | 8/2006 | McConville et al. | 280/93.512 |

FOREIGN PATENT DOCUMENTS

| | | |
|---|---|---|
| JP | 61-38341 | 3/1986 |
| JP | 61-104206 A | 7/1986 |
| JP | 03-050010 A | 3/1991 |
| JP | 04-059405 A | 2/1992 |
| JP | 4-59405 A | 2/1992 |
| JP | 04-218419 A | 8/1992 |
| JP | 05-280567 A | 10/1993 |

* cited by examiner

Primary Examiner—Paul N. Dickson  
Assistant Examiner—Drew J. Brown  
(74) Attorney, Agent, or Firm—Arent Fox LLP

(57) ABSTRACT

A suspension bushing is provided in a connection between a lower arm supporting a drive front wheel and a subframe. The suspension bushing includes an inner cylindrical portion secured to the subframe, an outer cylindrical portion secured to the lower arm, and a rubber resilient member joining the inner and outer cylindrical portions. A protrusion, provided on the rubber resilient member as a region receiving a load during acceleration of the vehicle, is arranged to have a greater spring constant than a portion of the rubber resilient member surrounding a second opening section provided as a region receiving a load during braking of the vehicle.

11 Claims, 13 Drawing Sheets

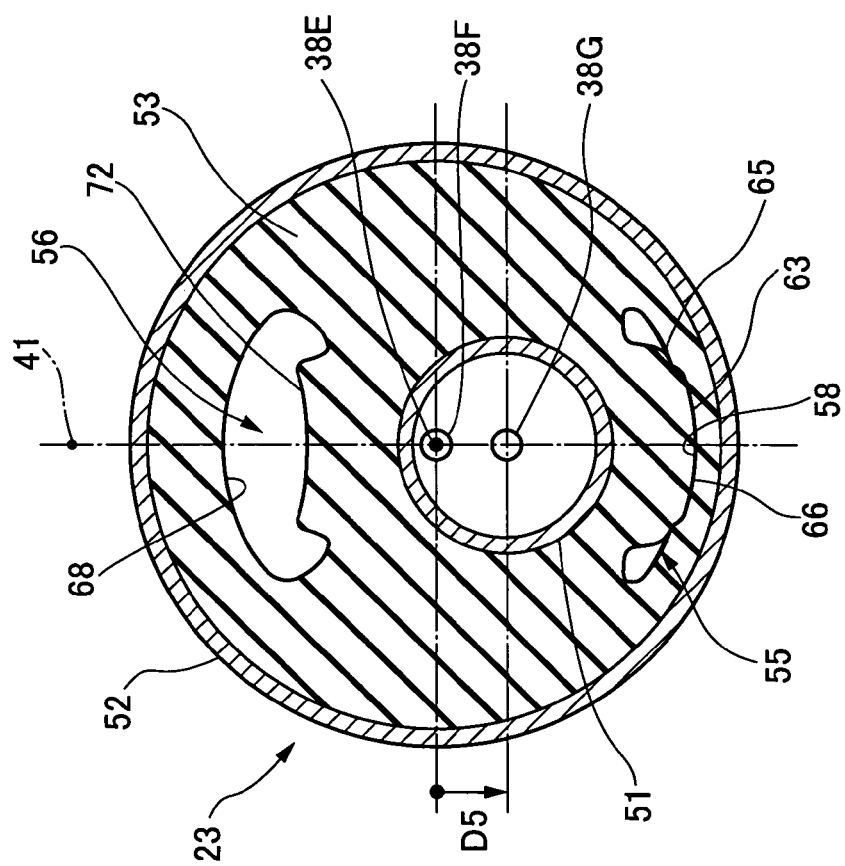
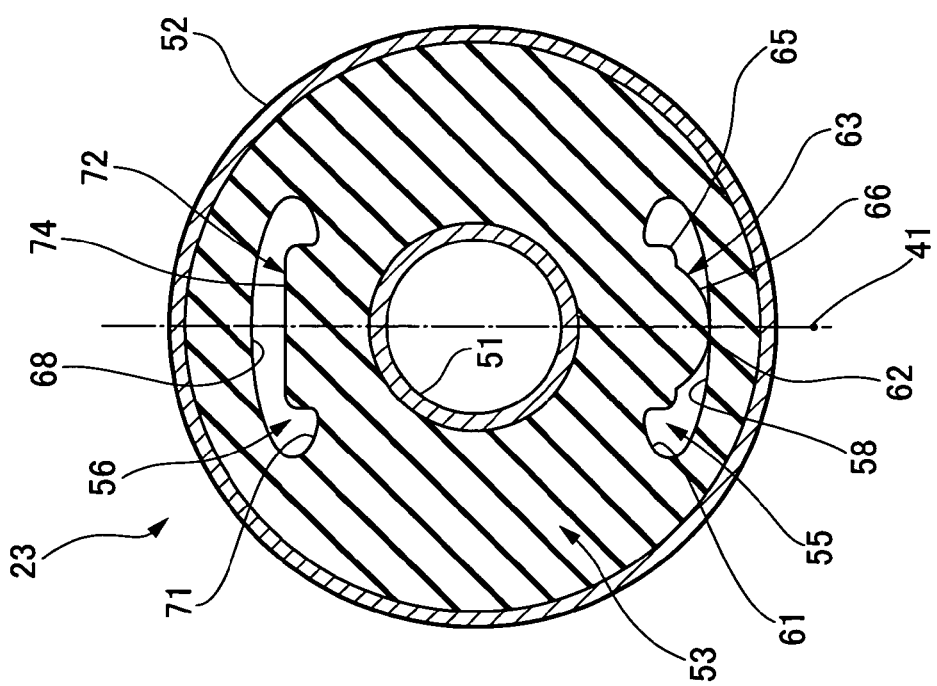
FIG. 12B
FIG. 12A

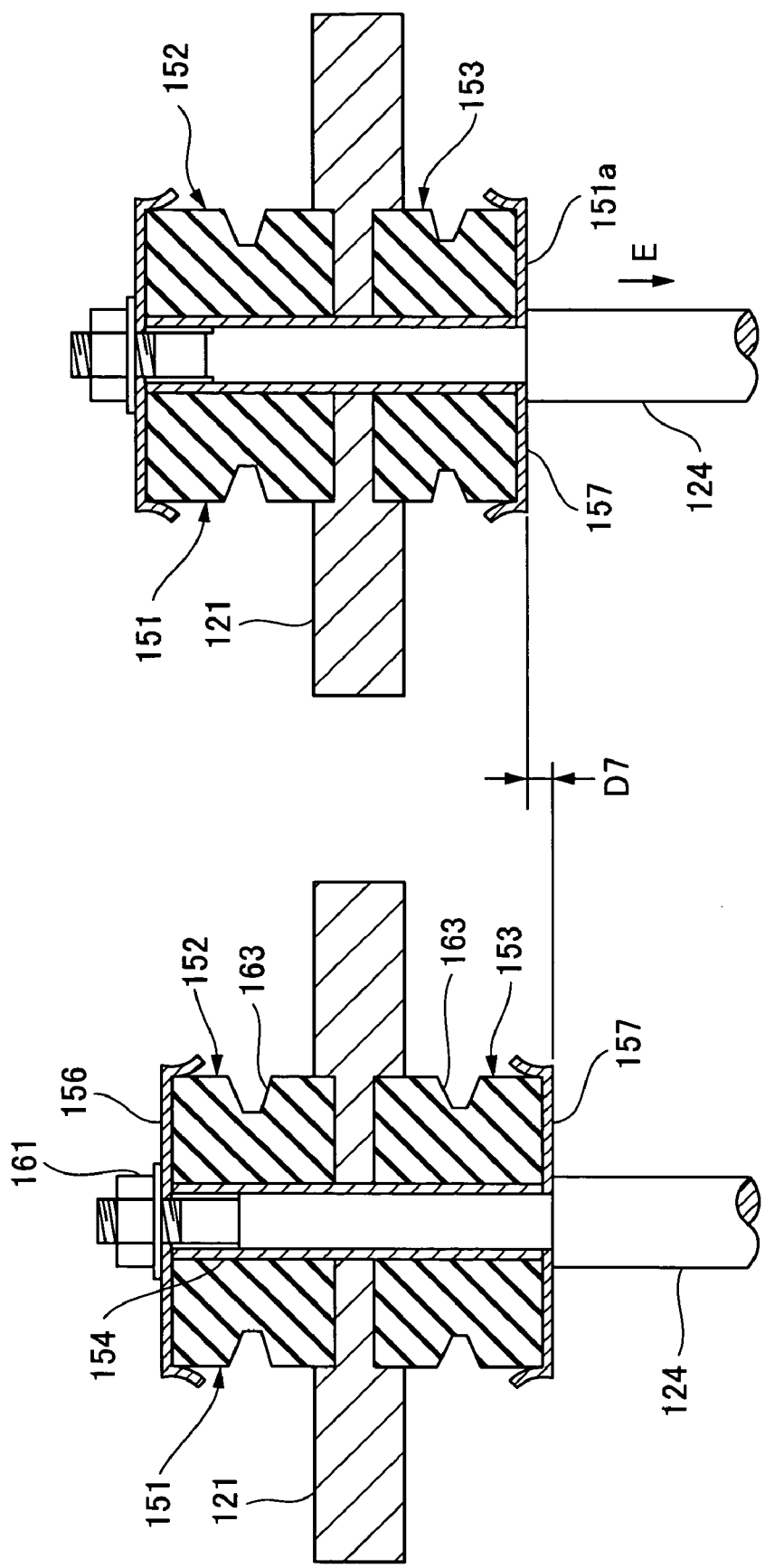

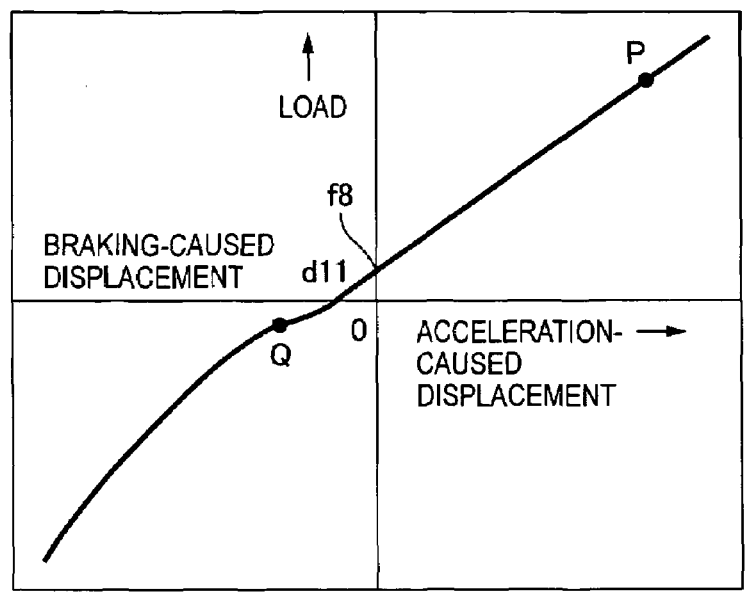
FIG.15
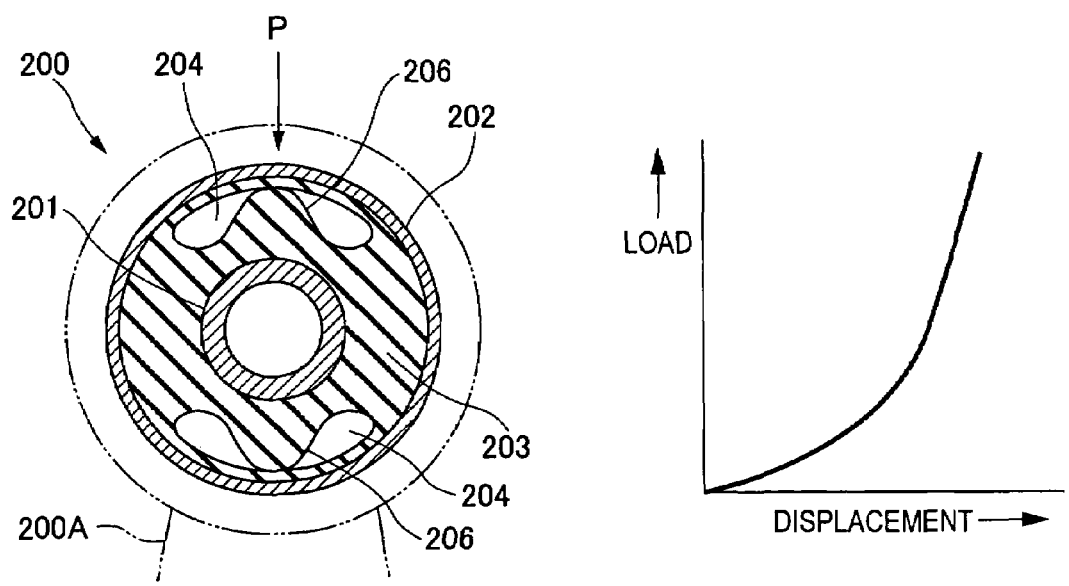
FIG.16A
(PRIOR ART)
FIG.16B
(PRIOR ART)

_US 7,364,176 B2_

VEHICULAR ANTI-VIBRATION STRUCTURE

FIELD OF THE INVENTION

The present invention relates to vehicular anti-vibration structures and more particularly to suspension bushings.

BACKGROUND OF THE INVENTION

As vehicular anti-vibration structures, there have been known, from Japanese Utility Model Application Laid-Open Publication No. SHO-61-38341 etc., anti-vibration bushings connecting vehicle-body-side members and suspension arms.

FIGS. 16A and 16B are explanatory of the conventional suspension bushing disclosed in the above-mentioned No. SHO-61-38341 publication. More specifically, FIG. 16A is a sectional view of an anti-vibration bushing constructed as the suspension bushing. This anti-vibration bushing 200 includes an inner cylindrical member 201 fixed to the body-side member, an outer cylindrical member 202 fixed to a rear suspension arm 200A and surrounding the inner cylindrical member 201, and a resilient member 203 joining together the inner and outer cylindrical members 201 and 202.

The resilient member 203 has a pair of hollow sections 204 opposed to each other with the inner cylindrical member 201 interposed therebetween. Each of the hollow sections 204 has a bulge 206 bulging radially outward, substantially in a shape of a mountain ridge, from its surface closer to the inner cylindrical member 201 toward the outer cylindrical member 202, and a peak (outer end) portion of the bulge 206 is abutted against its surface closer to the outer cylindrical member 202.

FIG. 16B is a graph showing relationship between load applied to the outer cylindrical member 202 via the rear suspension arm 200A in a direction of arrow P and amount of displacement of the outer cylindrical member 202 caused by the applied load through resilient compression of the resilient member 203. In the graph, the vertical axis represents the applied load, while the horizontal axis represents the displacement amount of the outer cylindrical member 202 through the compression of the resilient member 203. Specifically, the graph shows a nonlinear spring characteristic of the anti-vibration bushing 200, in accordance with which the characteristic curve presents a small inclination (i.e., the spring constant is small) while the displacement amount is small and the inclination (i.e., the spring constant) progressively becomes greater as the displacement amount increases.

With the nonlinear spring characteristic as shown in FIG. 16B, the spring constant remains relatively small while the displacement amount is in a medium value range. Thus, when, for example, the human driver or driver rapidly depresses and releases an accelerator pedal for rapid acceleration, in the vehicle employing the suspension bushing of FIG. 16A, so that a great load is applied in the direction of arrow P from a drive road wheel via the rear suspension arm 200A, forward/rearward vibration of the vehicle sometimes can not be suppressed effectively due to a poor damping performance of the anti-vibration bushing 200.

Namely, the anti-vibration bushing 200 does not function or contribute as a spring while the displacement amount of the outer cylindrical member 202 is in a small value range. If the characteristic curve inclination is increased in the example of FIG. 16B in order to allow the anti-vibration bushing 200 to contribute as a spring, the inclination would become excessively great in a great value range of the displacement amount so that the bushing 200 can not effectively absorb shocks. Further, in the suspension bushing of the Japanese patent, relationship between load applied to the outer cylindrical member 202 in an opposite direction to the arrow P direction and amount of displacement of the outer cylindrical member 202 caused by the applied load through resilient compression of the resilient member 203 is set to present a load vs. displacement characteristic curve that is symmetrical to that of FIG. 16B about the origin point of the graph of FIG. 16B; that is, the load vs. displacement characteristic curve is not differentiated in accordance with the direction of the applied load.

SUMMARY OF THE INVENTION

In view of the foregoing prior art problems, it is an object of the present invention to provide an improved vehicular anti-vibration structure, and particularly an improved suspension bushing structure, which can effectively minimize forward/rearward vibration of the vehicle during acceleration of the vehicle and give an improved ride on the vehicle.

According to one aspect of the present invention, there is provided an improved vehicular anti-vibration structure, which comprises: a suspension arm supporting a drive wheel; a vehicle-body-side member; and a suspension bushing disposed in a connection between the suspension arm and the vehicle-body-side member and including: a body-side bushing member attached to the vehicle-body-side member; an arm-side bushing member attached to the suspension arm; and a resilient member joining the body-side bushing member and the arm-side bushing member. In the suspension bushing of the present invention, a region of the resilient member that receives a load during acceleration of the vehicle (i.e., acceleration-caused load) has a greater spring constant than another region of the resilient member that receives a load during braking of the vehicle (i.e., braking-caused load).

With the greater spring constant of the region receiving the acceleration-caused load, the resilient member is allowed to produce a great load (i.e., great reactive force), through its compression, in response to the acceleration-caused load, which can thus improve the damping performance of the vehicular anti-vibration structure and minimize forward/rearward vibration of the vehicle.

According to another aspect of the present invention, there is provided a vehicular anti-vibration structure of the above-mentioned type which comprises: a suspension arm supporting a drive wheel; a vehicle-body-side member; and a suspension bushing disposed in a connection between the suspension arm and the vehicle-body-side member and including: a body-side bushing member attached to the vehicle-body-side member; an arm-side bushing member attached to the suspension arm; and a resilient member joining the body-side bushing member and the arm-side bushing member, and the vehicular anti-vibration structure of the invention is characterized in that, in the suspension bushing the a region of the resilient member receiving a load during acceleration of the vehicle has a more linear load vs. displacement characteristic than another region of the resilient member that receives a load during braking of the vehicle. With such inventive arrangements, the load (i.e., reactive force) produced in the region of the resilient member receiving a load during acceleration of the vehicle can be made greater than the load (i.e., reactive force) produced in the region of the resilient member receiving a load during braking of the vehicle, so that the damping performance of the vehicular anti-vibration structure can be significantly enhanced. Thus, the region of the suspension bushing, which receives a load during acceleration of the vehicle, is allowed to operate effectively and receive the load applied to the suspension bushing with no substantive shock or impact, by virtue of the great reactive force. provided a vehicular anti-vibration structure of the above-mentioned type which comprises: a suspension arm supporting a drive wheel; a vehicle-body-side member; and a suspension bushing disposed in a connection between the suspension arm and the vehicle-body-side member and including: a body-side bushing member attached to the vehicle-body-side member; an arm-side bushing member attached to the suspension arm; and a resilient member joining the body-side bushing member and the arm-side bushing member, and the vehicular anti-vibration structure of the present invention is characterized in that the suspension bushing is mounted in the vehicle with previous positional displacement or bias in a direction of the load received during acceleration of the vehicle. With such previous positional displacement or bias, the suspension bushing can produce a great load (i.e., great reactive force) from the initial displacement stage onward, thereby enhancing the damping performance during acceleration of the vehicle. Because the region of the suspension bushing receiving a load during braking of the vehicle is formed of a relatively soft material, the displacement of the suspension bushing, caused when the vehicle gets over a projecting road surface, can be softly taken primarily by that region of the bushing without producing no substantial load or reactive force, so that the vehicle can give an improved ride.

BRIEF DESCRIPTION OF THE DRAWINGS

Certain preferred embodiments of the present invention will hereinafter be described in detail, by way of example only, with reference to the accompanying drawings, in which:

FIGS. 12A and 12B are sectional views showing a vehicular anti-vibration structure in accordance with a sixth embodiment of the present invention;

FIGS. 13A and 13B are sectional views showing a vehicular anti-vibration structure in accordance with a seventh embodiment of the present invention;

FIG. 15 is a graph showing a load vs. displacement characteristic of a vehicular anti-vibration structure in accordance with an eight embodiment of the present invention; and FIGS. 16A and 16B are views explanatory of a conventional suspension bushing.

DETAILED DESCRIPTION OF THE PREFERRED EMBODIMENTS

Figure 1:
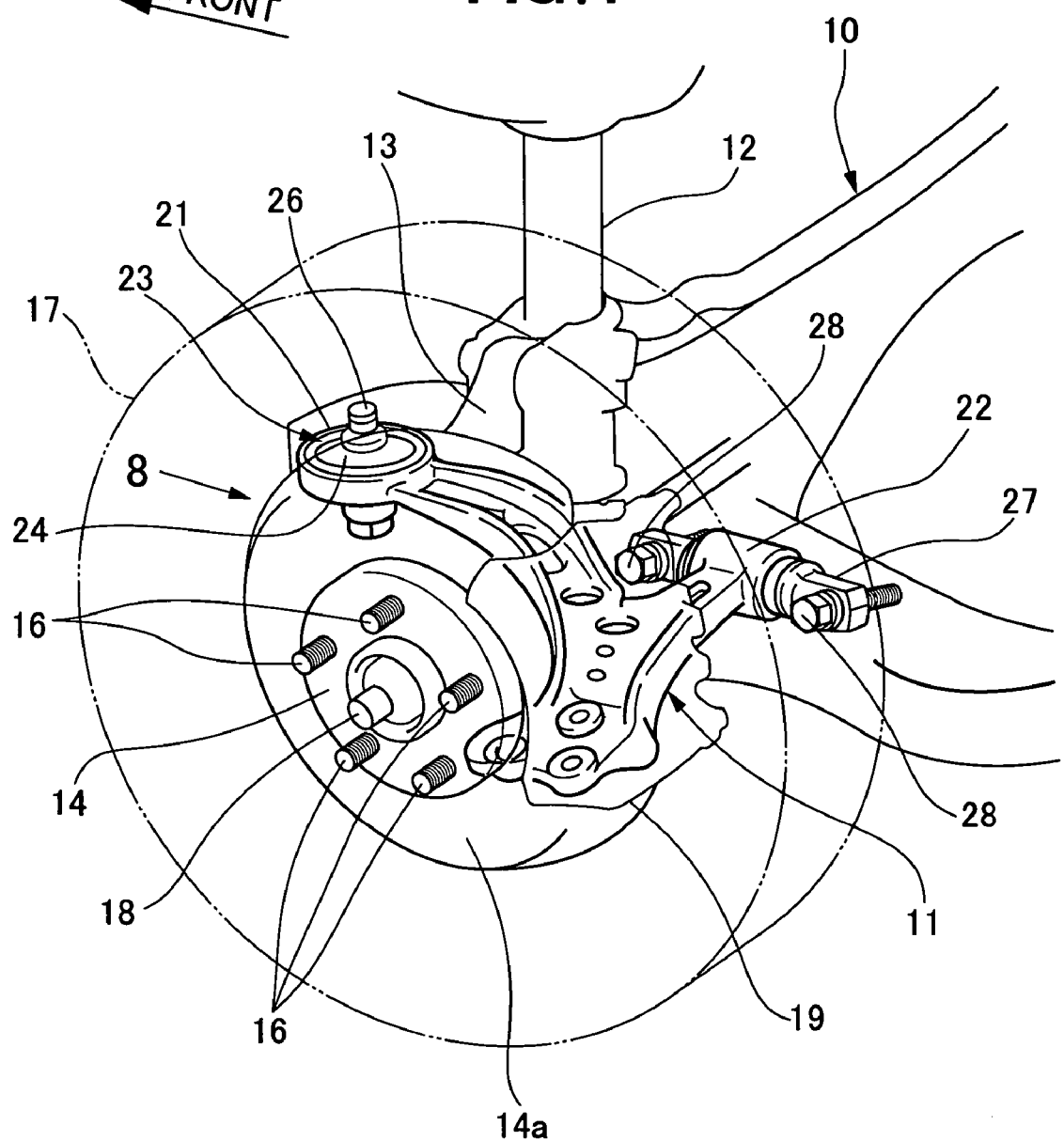
FIG. 1 is a perspective view of a front suspension assembly employing a vehicular anti-vibration structure of the present invention.

FIG. 1 is a perspective view of a front suspension assembly including a vehicular anti-vibration structure in accordance with a first embodiment of the present invention; in the figure, an arrow "FRONT" represents a forward direction of the vehicle. Lower arm 11 functioning as a suspension arm is vertically pivotably mounted on a subframe 10 as a vehicle-body-side subframe secured to a front lower portion of the vehicle body, and a suspension strut 12 is secured to a front upper portion of the vehicle body. One end of the lower arm 11 and a lower portion of the suspension strut 12 are connected to a knuckle 13, and a hub 14 is rotatably connected to the knuckle 13. Front wheel 17 is mounted on the hub 14 via a plurality of stud bolts 16 and wheel nuts (not shown).

The front wheel 17 is a drive wheel that can produce a driving force via an axle 18 connecting between the center of the hub 14 and an engine (not shown). Reference 14a represents a brake disk secured to the outer periphery of the hub 14. and 19 represents a brake caliper fitting over the brake disk 14a.

The lower arm 11 has a front cylindrical portion 21 and rear cylindrical portion 22 fixed to the subframe 10. The front cylindrical portion 21 has a suspension bushing 23 fitted therein, and it is fixed to the subframe 10 by means of a bolt 26 extending through the suspension bushing 23 and upper and lower washers 24 (only the upper washer 24 is shown) vertically holding the suspension bushing 23 therebetween.

The rear cylindrical portion 22 has a shaft member 27 fitted therethrough via a resilient member, and it is fixed to the subframe 10 by means of bolts inserted through opposite axial end portions thereof.

Figure 2:
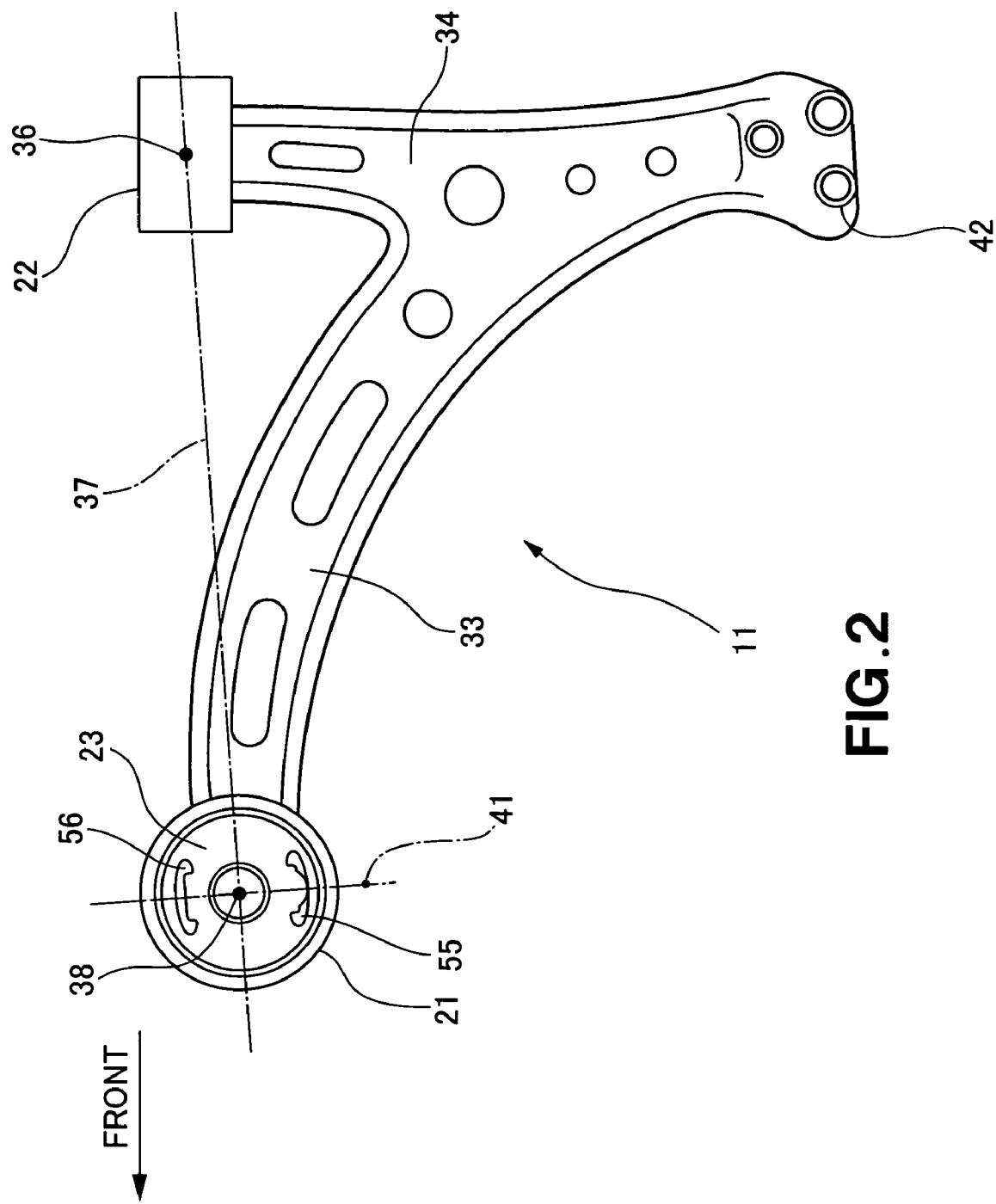
FIG. 2 is a plan view of a lower arm in the first embodiment of the vehicular anti-vibration structure.

FIG. 2 is a plan view of the lower arm 11 in the vehicular anti-vibration structure of the present invention. The lower arm 11 a first arm section 33 of a generally arcuate shape, and a second arm section 34 of a generally straight shape extending at an acute angle relative to a one end portion of the first arm section 33. The front cylindrical portion 21 is provided at a distal end of the first arm section 33, the suspension bushing 23 is fitted in the front cylindrical portion 21, and the rear cylindrical portion 22 is provided at a distal end of the second arm section 34.

The front cylindrical portion 21 has a vertically-extending axis, while the rear cylindrical portion 22 has an axis extending horizontally in a front-and-rear direction of the vehicle. Reference numeral 36 in the figure represents a rotation axis about which the lower arm 11a is pivotable in the horizontal plane, and the rotation axis 36 is located substantially at the center of the rear cylindrical portion 22 as viewed in plan. Reference numeral 37 represents an imaginary straight line passing the rotation axis 36 and a center point 38 of the suspension bushing 23, 41 represents an imaginary straight line passing the center point 38 and intersecting at right angles with the straight line 37, and 42 represents a mounting portion of the lower arm 11 via which the lower arm 11 is mounted on the knuckle 13 (see FIG. 1) by means of a ball joint.

Figure 3:
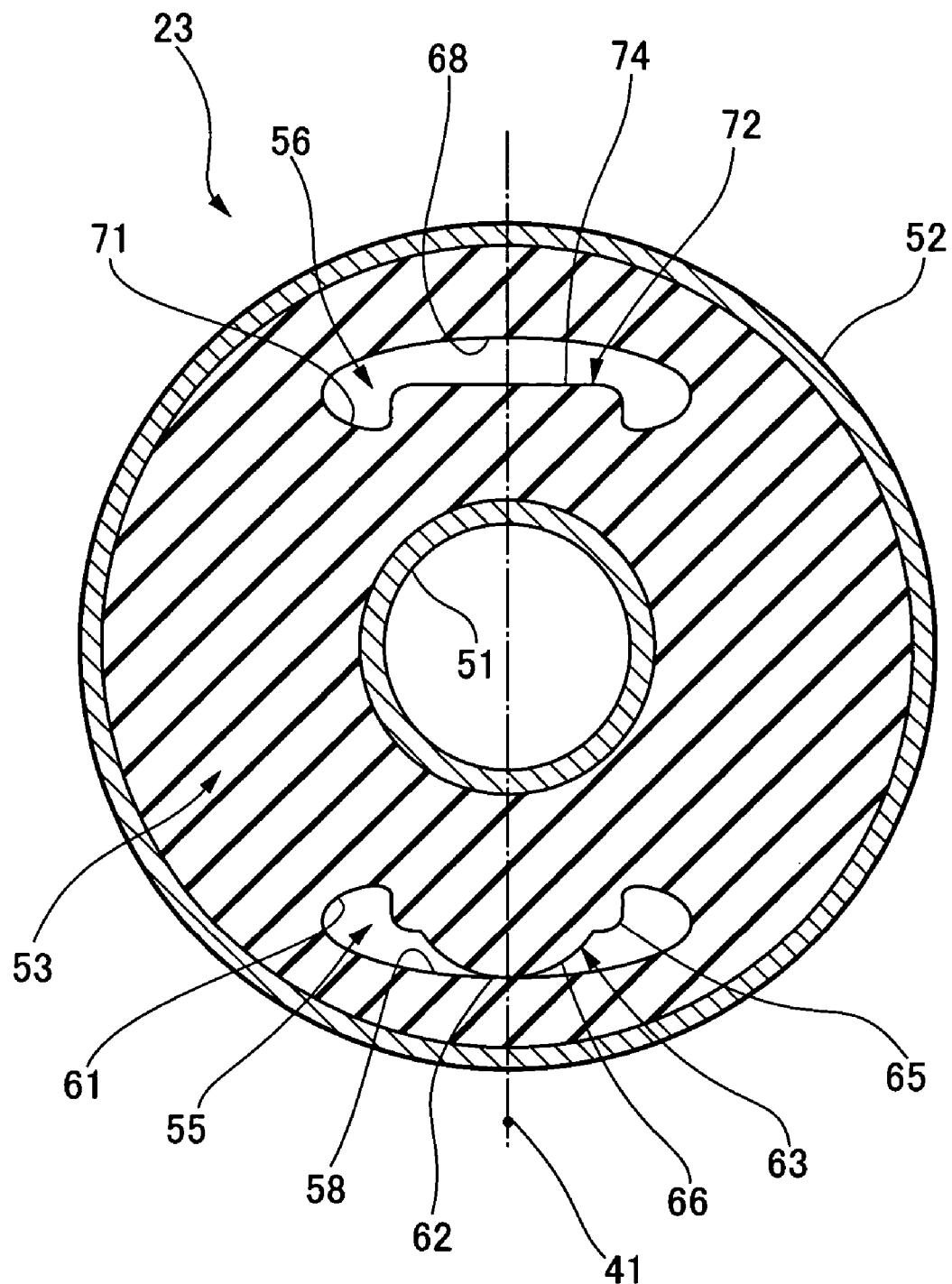
FIG. 3 is a sectional view of a suspension bushing in the first embodiment of the vehicular anti-vibration structure.

FIG. 3 is a sectional view of the suspension bushing 23 in the vehicular anti-vibration structure of the present invention. The suspension bushing 23 includes an inner cylindrical portion 51 as a body-side bushing member secured to the subframe 10 (FIG. 1), and an outer cylindrical portion 52 as an arm-side bushing member surrounding the inner cylindrical portion 51 and secured to the lower arm 11 (FIG. 2). The suspension bushing 23 also includes a rubber resilient member 53 secured to both of the inner and outer cylindrical portions 51 and 52 by vulcanization adhesion.

The rubber resilient member 53 has first and second opening sections 55 and 56 with the inner cylindrical portion 51 located therebetween, and these opening sections 55 and 56 each have a shape symmetrical about the straight line 41 passing the center point 38 and intersecting at right angles with the straight line 37.

The first opening section 55 is a portion that affects the vibration attenuating or damping performance of the structure when the outer cylindrical portion 52 has moved (upward in the figure) relative to the inner cylindrical portion 51 along the straight line 41 (i.e., during acceleration of the vehicle). The first opening section 55 has a concave surface 58 on its side closer to the outer cylindrical portion 52, and a first radial protrusion 63 projecting generally arcuately in a radial outward direction from another concave surface 61, opposed to the concave surface 58, and having a top 62 contacting the concave surface 58. The first radial protrusion 63 has a base protruding portion 65 formed on the concave surface 61 near the opposite ends thereof, and an arcuate bulge portion 66 projecting outwardly from the base protruding portion 65.

The second opening section 56 has a concave surface 68 on its side closer to the outer cylindrical portion 52, and a second protrusion 72 projecting in a radial outward direction from another concave surface 71 opposed to the concave surface 68. The second radial protrusion 72 has a flat top 74 portion.

The following paragraphs describe behavior of the suspension bushing 23 constructed in the above-described manner.

Figure 4:
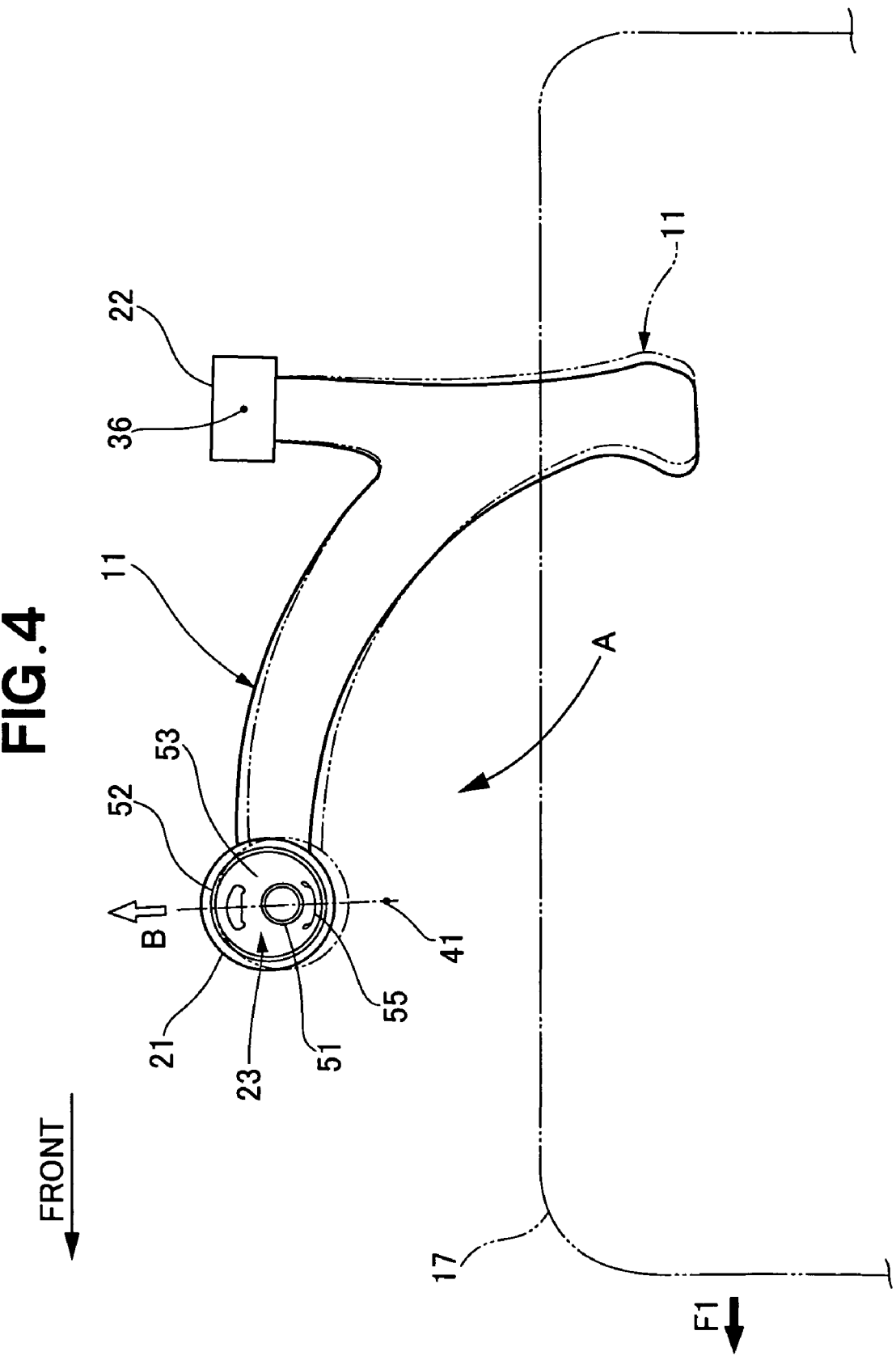
FIG. 4 is a view explanatory of behavior of the suspension bushing and lower arm in the first embodiment of the vehicular anti-vibration structure.

FIG. 4 is a view explanatory of behavior of the suspension bushing 23 and lower arm 11 in the anti-vibration structure of the invention. For example, once the human operator or driver of the vehicle rapidly steps on or depresses an accelerator pedal for rapid acceleration of the vehicle, a great drive force is produced in the drive wheel (in this case, front wheel 17) due to a rising output of the engine, so that a force F1, acting to move the vehicle forward, is produced in the front wheel 17.

With the force F1, the lower arm 11 coupled to the front wheel 17 is caused to slightly pivot about the rotation axis, in a direction of arrow A, from a position depicted by phantom lines to a position depicted by solid lines. At that time, the outer cylindrical portion 52 of the lower arm 11 moves in a direction of white arrow B, i.e., in the direction of the straight line 41.

In this case, the inner cylindrical portion 51 in the suspension bushing 23 does not move, so that the first opening section 55 and rubber resilient member 53 in the bushing 23 are compressed due to the movement, in the arrow B direction, of the outer cylindrical portion 52.

Figure 5:
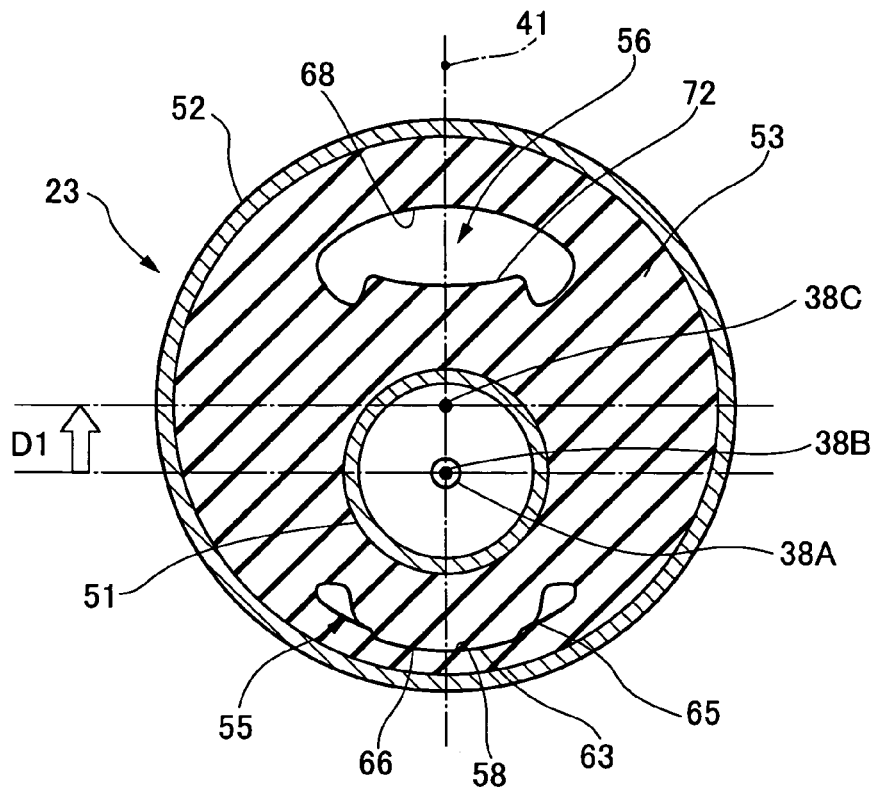
FIG. 5 is a view also explanatory of the behavior of the suspension bushing in the first embodiment of the vehicular anti-vibration structure.

FIG. 5 is a view more fully explanatory of the behavior of the suspension bushing 23 in the first embodiment during acceleration of the vehicle. As the outer cylindrical portion 52 moves upward in the figure along the straight line 41 with the inner cylindrical portion 51 (having its center point 38A) fixed in position, namely, as the outer cylindrical portion 52 having its initial center point at 38B moves upward a predetermined distance D1 in such a manner that the initial center point 38B of the cylindrical portion 52 is displaced to a position 38C (i.e., position of an after-movement center point 38C), the first radial protrusion 63 of the first opening section 55 resiliently collapses with not only the arcuate bulge portion 66 but also the base protruding portion 65 pressed against the concave surface 58. In this way, the suspension bushing 23 achieves a great damping performance with an increased spring constant.

Namely, the first opening section 55 is provided at a location where a load acts during acceleration of the vehicle; specifically, it is the first radial protrusion 63 of the first opening section 55 that receives the load during acceleration of the vehicle (i.e., acceleration-caused load).

Figure 6:
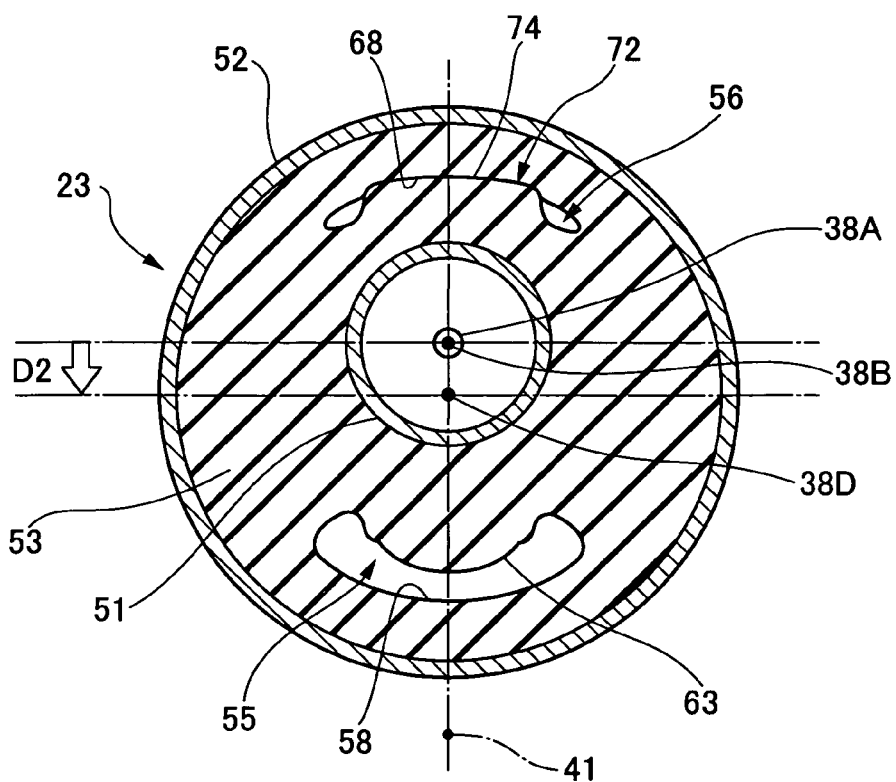
FIG. 6 is a view also explanatory of the behavior of the suspension bushing in the first embodiment of the vehicular anti-vibration structure.

FIG. 6 is a view also explanatory of the behavior of the suspension bushing 23, which particularly shows how the suspension bushing 23 is deformed during braking, by activation of a foot brake, of the vehicle. After resilient deformation of the first opening section 55 of the suspension bushing 23, the outer cylindrical portion 52 is pushed back, along the straight line 41, in a downward direction of the figure due to a reaction force of the resilient deformation. Namely, as the outer cylindrical portion 52 is pushed back a predetermined distance D2 in such a manner that the initial center point 38B is displaced to a position 38D (i.e., after-movement center point 38D), the first radial protrusion 63 of the first opening section 55 moves away from the concave surface 58, and a peak or top portion 74 of the second radial protrusion 72 in the second opening section 56 abuts against the concave surface 68, so that the suspension bushing 23 achieves a damping performance during rebounding. The suspension bushing 23 behaves in the above-described manner when the vehicle is braked or the vehicle gets over a projecting road surface.

The second opening section 56 is provided at a location where a load acts during rebounding or braking of the vehicle.

Figure 7:
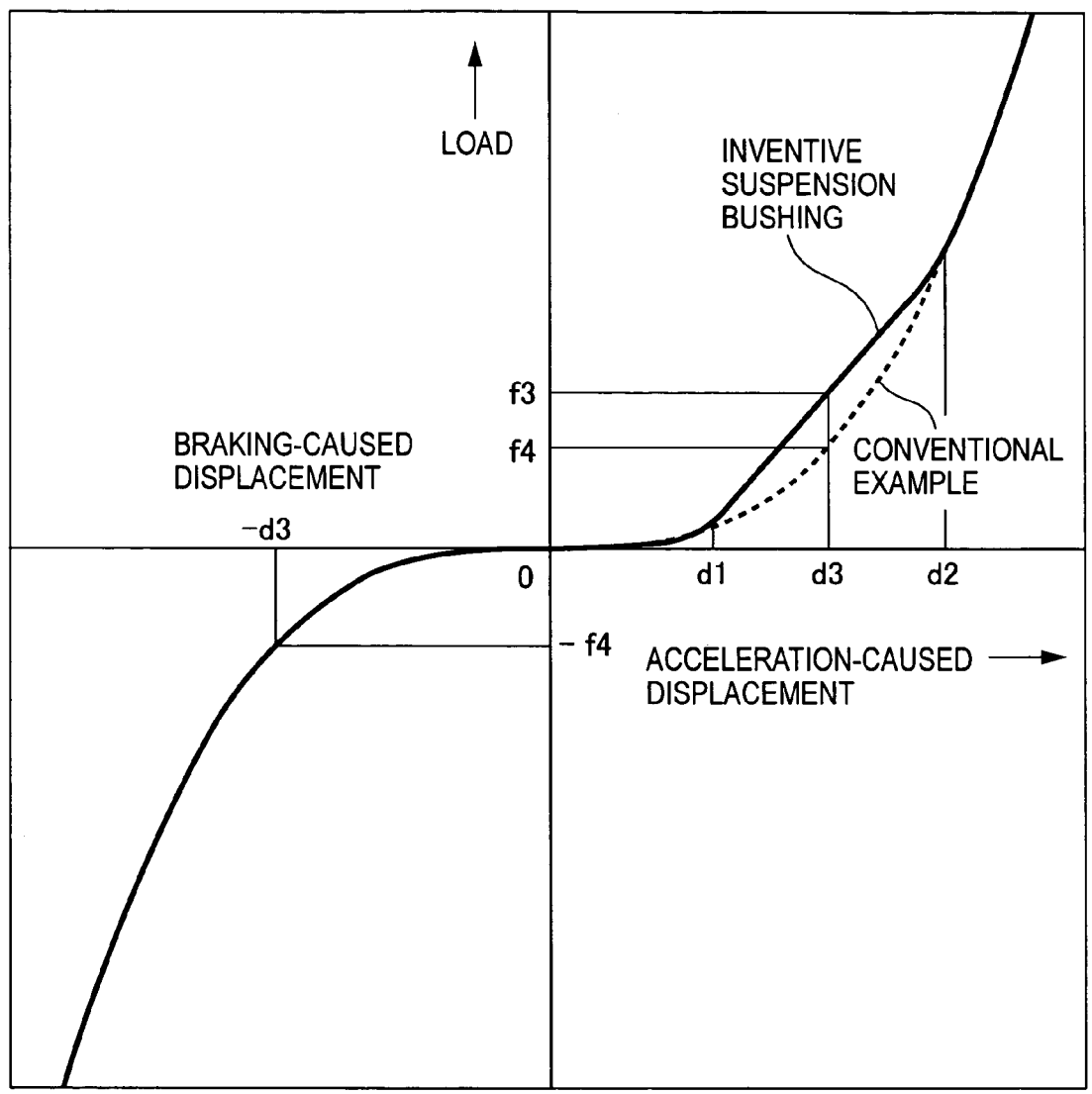
FIG. 7 is a graph showing relationship between a load produced by the suspension bushing and an amount of displacement of the suspension bushing in the first embodiment.

FIG. 7 is a graph showing relationship between the load produced by the suspension bushing 23 (more specifically, reactive force produced, by the bushing 23 in response to a load externally applied thereto, in an opposite direction to the applied load) and the amount of displacement (resilient compression) of the suspension bushing 23 caused by the applied load. In the graph, the vertical axis represents the load, while the positive side of the horizontal axis represents the amount of the displacement during acceleration of the vehicle (hereinafter also referred to as "acceleration-caused displacement") and the negative side of the horizontal axis represents the amount of the displacement during braking of the vehicle (hereinafter also referred to as "braking-caused displacement").

Whereas the conventional suspension bushing shown in FIGS. 16A and 16B (hereinafter referred to as "conventional example") presents a load vs. displacement characteristic curve symmetrical about the origin point, the suspension bushing 23 employed in the instant embodiment of the invention (hereinafter referred to as "inventive suspension bushing") presents a linear load vs. displacement characteristic curve in a medium value range of the acceleration-caused displacement, while the conventional example presents a nonlinear load vs. displacement characteristic curve in the medium value range of the acceleration-caused displacement as indicated by a dotted line of FIG. 7, Namely, for an acceleration-caused displacement range from d1 to d2, the inventive suspension bushing 23 produces a greater load (i.e., greater reactive force) than the conventional example. For example, when the acceleration-caused displacement amount is d3, the inventive suspension bushing 23 produces a load f3, while the conventional example produces a load f4 smaller than the load f3 (i.e., f3>f4). When the braking-caused displacement amount is −d3, both the inventive suspension bushing 23 and the conventional example produce a load −f4.

Namely, because the instant embodiment is arranged to present the linear load vs. displacement characteristic curve in the medium value range of the acceleration-caused displacement amount of the suspension bushing 23, it allows a region of the bushing 23, which receives a load during acceleration of the vehicle, to operate effectively, so that it can receive the load applied to the suspension bushing 23 with no substantive shock or impact.

Further, because the region of the suspension bushing 23, receiving an external load at an initial stage of the braking-caused displacement of the suspension bushing 23, is formed of a relatively soft material, the displacement of the bushing 23, caused when the vehicle gets over a projecting road surface, can be softly taken primarily by that region of the bushing 23 without producing no substantial load or reactive force, so that the vehicle can give an improved ride.

As described above, the vehicular anti-vibration structure of the present invention is of the type where the suspension bushing 23 is disposed in the connection between the subframe 10 and the lower arm 11 supporting the front wheel 17 and where the suspension bushing 23 includes the rubber resilient member 53 connecting between the inner cylindrical portion 51 secured to the subframe 10 and the outer cylindrical portion 52 secured to the lower arm 11. As having been set forth above with primary reference to FIGS. 1, 4 and 5, the vehicular anti-vibration structure of the present invention is characterized in that the first radial protrusion 63, provided on the rubber resilient member 53 as an area receiving a load during acceleration of the vehicle (i.e., acceleration-caused load), is arranged to have a greater spring constant than a portion of the rubber resilient member 53 surrounding the second opening section 56 provided as an area receiving a load during braking of the vehicle (i.e., braking-caused load).

With the greater spring constant of the first radial protrusion 63 of the rubber resilient member 53 in the suspension bushing 23, the vehicular anti-vibration structure of the present invention can improve the damping performance achievable through the compression of the rubber resilient member 53 during acceleration of the vehicle.

As having been set forth above with primary reference to FIGS. 1, 3 and 7, the vehicular anti-vibration structure of the present invention is also characterized in that the first radial protrusion 63, provided on the rubber resilient member 53 as the area receiving a load during acceleration of the vehicle, is arranged to present a more linear load vs. displacement characteristic than the portion of the rubber resilient member 53 surrounding the second opening section 56 provided as the area receiving a load during braking of the vehicle.

With the load vs. displacement characteristic of the first radial protrusion 63 more linear than that of the portion of the rubber resilient member 53 surrounding the second opening section 56, the load (i.e., reactive force) produced in the first radial protrusion 63 can be made greater than the load (i.e., reactive force) produced in the portion of the rubber resilient member 53 surrounding the second opening section 56, which can even further improve the damping performance during acceleration of the vehicle. As a result, the present invention allows the region, receiving the load during acceleration of the vehicle, to operate effectively, and the greater produced load (i.e., reactive force) allows the load applied to the suspension bushing 23 to be received with no substantive shock or impact.

As seen from FIG. 1 and FIGS. 12A and 12B, the vehicular anti-vibration structure of the present invention is also characterized in that the suspension bushing 23 is mounted in a predetermined position of the vehicle with previous displacement (i.e., previous positional deviation or bias) in the direction of a load received during acceleration of the vehicle. With the previous positional bias, the suspension bushing 23 can produce a great load (i.e., great reactive force) from the initial displacement stage onward, thereby enhancing the damping performance during acceleration of the vehicle.

Further, because the region of the suspension bushing 23 receiving a load during braking of the vehicle is formed of the soft material, the displacement of the suspension bushing 23, caused when the vehicle gets over a projecting road surface, can be softly taken primarily by that region without producing a great reactive force, so that the vehicle can give an improved ride.

Figure 8A:
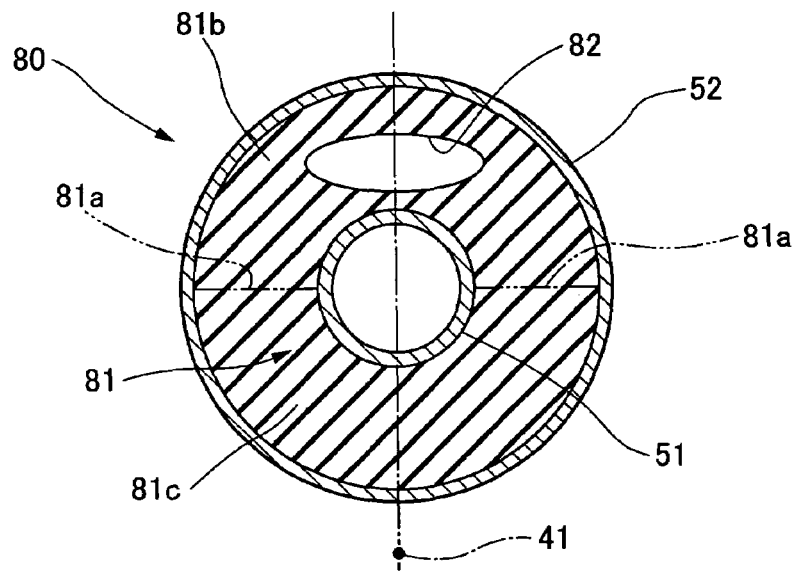
FIGS. 8A to 8C are sectional views explanatory of second to fourth embodiments of the present invention.
Figure 8B:
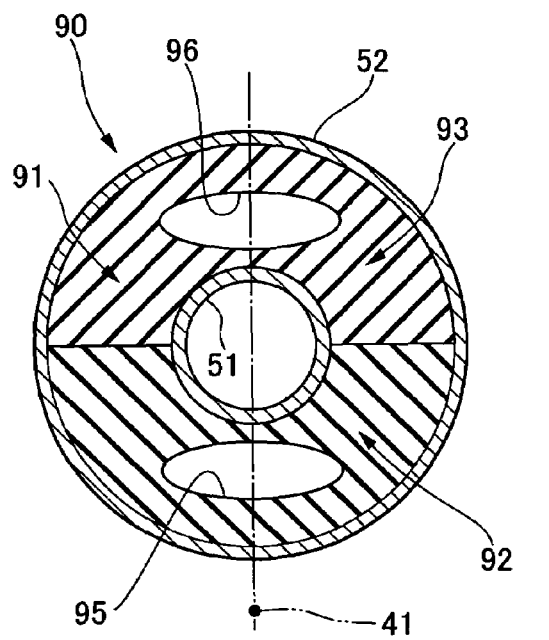

FIGS. 8A to 8B are sectional views explanatory of second to fourth embodiments of the present invention, where modified examples of the suspension bushing 80, 90 and 100 are employed. In these figures, the same elements as in FIG. 3 are represented by the same reference numerals, which will not be described in detail to avoid unnecessary duplication.

The suspension bushing 80 employed in the second embodiment, as shown in FIG. 8A, includes the inner and outer cylindrical portions 51 and 52, and a rubber resilient member 81 secured to both of the inner and outer cylindrical portions 51 and 52 by vulcanization adhesion.

The rubber resilient member 81 has an opening section 82 only in a region where a load acts during braking of the vehicle (i.e., region located upwardly of the inner cylindrical portion 51 in the figure); that is, no opening section is provided in a region where a load acts during acceleration of the vehicle (i.e., region located downwardly of the inner cylindrical portion 51 in the figure).

In the figure, two imaginary lines 81a, extending at right angles to the above-mentioned line 41, divide the rubber resilient member 81 into two equal parts: a braking-load-applied half 81b that includes the region with the opening section 82 where a load acts during braking of the vehicle; and an acceleration-load-applied half 81c that includes the region with no opening section where a load acts during acceleration of the vehicle. Namely, the braking-load-applied half 81b is a region receiving a load during braking of the vehicle, while the acceleration-load-applied half 81c is a region receiving a load during acceleration of the vehicle.

Because the rubber resilient member 81 has no opening section in the region that receives a load during acceleration of the vehicle and has the opening section 82 only in the region that receives a load during braking of the vehicle, the load vs. displacement characteristic during acceleration of the vehicle can be made linear, and the damping performance during acceleration of the vehicle can be even further improved.

The suspension bushing 90 employed in the third embodiment, as shown in FIG. 8B, includes the inner and outer cylindrical portions 51 and 52, and a rubber resilient member 91 secured to both of the inner and outer cylindrical portions 51 and 52 by vulcanization adhesion. The rubber resilient member 91 comprises a first semicircular rubber portion 92 located in one side of the suspension bushing 90 where a load acts during acceleration of the vehicle (i.e., side around a lower half of the inner cylindrical portion 51 in the figure), and a second semicircular rubber portion 93 located in the other side of the suspension bushing 90 where a load acts during braking of the vehicle (i.e., side around an upper half of the inner cylindrical portion 51 in the figure). The first and second semicircular rubber portions 92 and 93 are joined together in a given suitable manner.

The first semicircular rubber portion 92 has a greater hardness than the second semicircular rubber portion 93, and the first and second semicircular rubber portions 92 and 93 has first and second opening sections 95 and 96, respectively, with the inner cylindrical portion 51 interposed therebetween. The first semicircular rubber portion 92 is a region that receives a load during acceleration of the vehicle, while the second semicircular rubber portion 93 is a region that receives a load during braking of the vehicle.

Because the rubber resilient member 91 in the suspension bushing 90 comprises the first semicircular rubber portion 92 of the greater hardness provided in the one side where a load acts during acceleration of the vehicle and the second semicircular rubber portion 93 of the smaller hardness provided in the other side where a load acts during braking of the vehicle, the load vs. displacement characteristic during acceleration of the vehicle can be made linear, and the damping performance during acceleration of the vehicle can be even further improved.

Figure 8C:
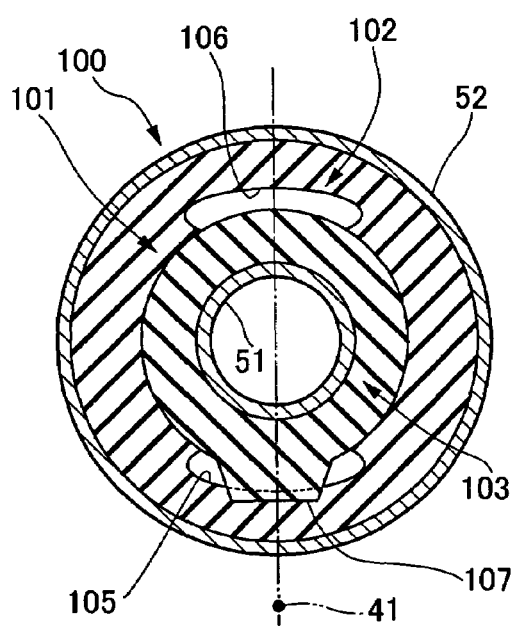

The suspension bushing 100 employed in the fourth embodiment, as shown in FIG. 8C, includes the inner and outer cylindrical portions 51 and 52, and a rubber resilient member 101 secured to both of the inner and outer cylindrical portions 51 and 52 by vulcanization adhesion. The rubber resilient member 101 comprises an outer circular rubber portion 102 abutted against the inner peripheral surface of the outer cylindrical portion 52, and an inner circular rubber portion 103 joined to the inner peripheral surface of the outer circular rubber portion 102. In diametrically-spaced two portions of the outer circular rubber portion 102, where the portion 102 contacts the inner circular rubber portion 103 and between which the inner cylindrical portion 51 is located, there are provided first and second opening sections 105 and 106, respectively. The inner circular rubber portion 103 has an outward protrusion 107 extending through the width of the first opening section 105 to be pressed into part of the outer circular rubber portion 102.

The above-mentioned outward protrusion 107 is an area that receives a load during acceleration of the vehicle, while the second opening section 106 is an area that receives a load during braking of the vehicle.

With the arrangements that the inner circular rubber portion 103 has a hardness greater than the outer circular rubber portion 102 and has the outward protrusion 107 extending through the width of the first opening section 105 to be pressed into part of the outer circular rubber portion 102, the load vs. displacement characteristic during acceleration of the vehicle can be made linear, and the damping performance during acceleration of the vehicle can be even further improved.

Figure 9:
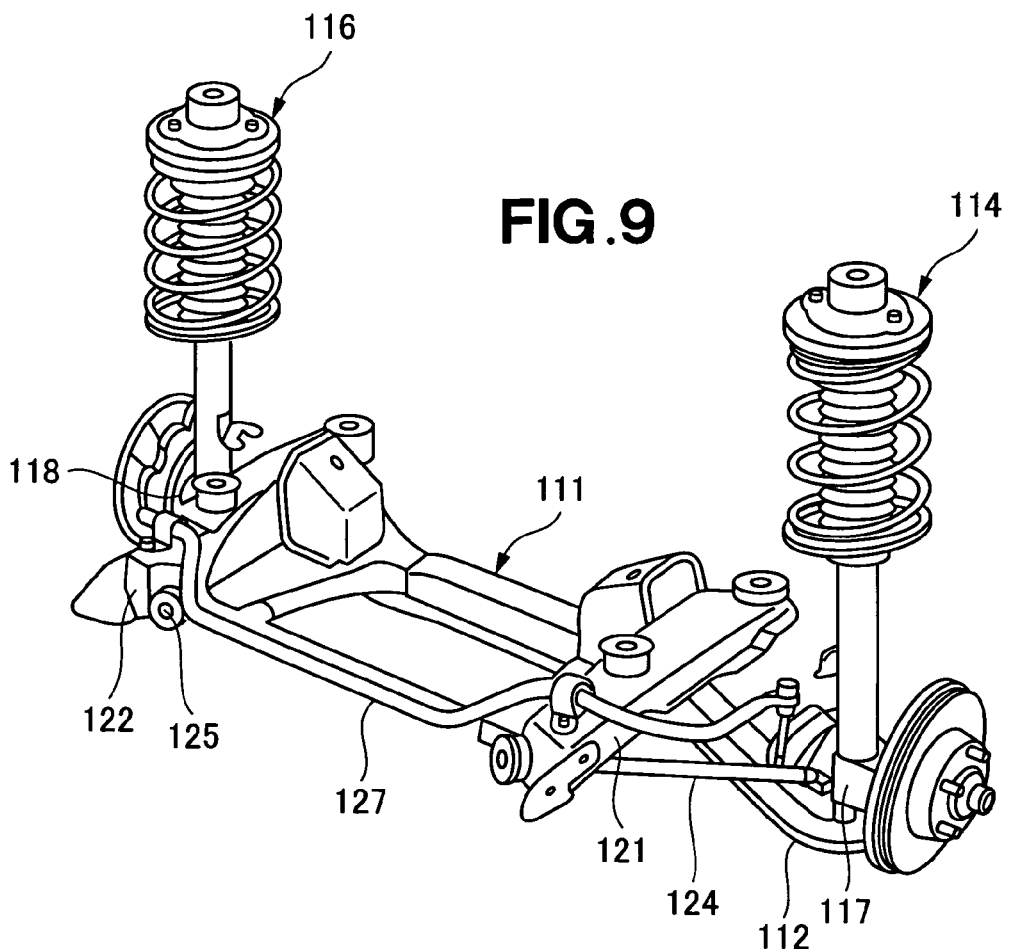
FIG. 9 is a perspective view of a front suspension assembly employing a vehicular anti-vibration structure in accordance with a fifth embodiment of the present invention.

FIG. 9 is a perspective view of the front suspension assembly employing a vehicular anti-vibration structure in accordance with a fifth embodiment of the present invention. Left and right suspension arms 112 (only one of the arms 112 is shown in the figure) are vertically pivotably mounted on a suspension member 111 as a vehicle-body-side member secured to a front lower portion of the vehicle body, and suspension struts 114 and 116 are secured to a front upper portion of the vehicle body. Knuckle 117 for rotatably supporting one of the front wheels is attached to the distal end of the suspension arm 112 and a lower end portion of the suspension strut 114, and another Knuckle 118 for rotatably supporting the other front wheel is attached to the distal end of the other suspension arm 112 and a lower end portion of the other suspension strut 116. Left and right support members 121 and 122, both extending in the front-and-rear direction of the vehicle, are secured to left and right end portions of the suspension member 111, and tension rods 124 and 125 for positioning the suspension arms 112 in the front-and-rear direction extend leftward and rightward from the respective distal ends of the left and right support members 121 and 122. Reference numeral 127 represents an anti-roll bar.

Figure 10:
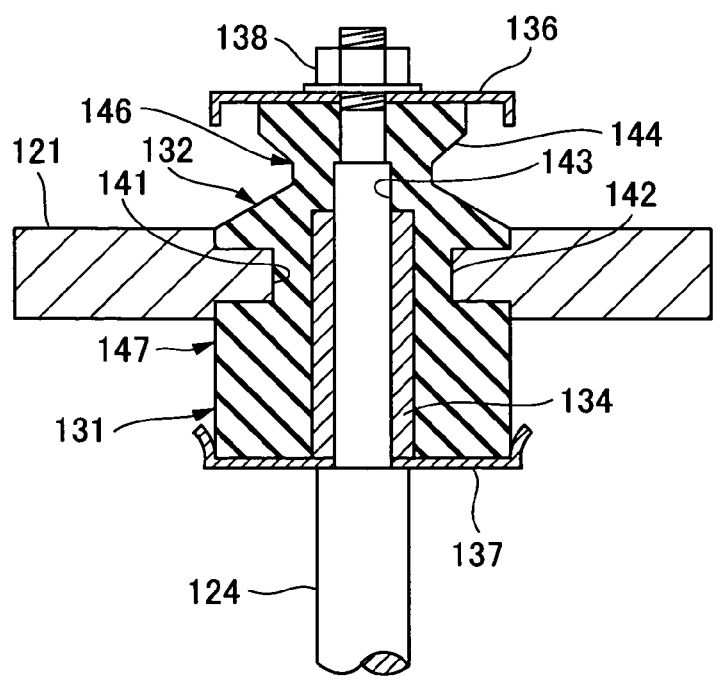
FIG. 10 is a sectional view explanatory of the fifth embodiment of the vehicular anti-vibration structure.

FIG. 10 is a sectional view of the fifth embodiment of the anti-vibration structure, which particularly shows that the tension rod 124 is connected at its front end to the support member 121 via a rubber bush member 131. The rubber bush member 131 includes a rubber section 132, a collar 134 fitted in the rubber portion 132, and a pair of end cap members 136 and 137 secured to the opposite ends of the rubber section 132 by vulcanization adhesion. Reference numeral 138 represents a nut securing the rubber bush member 131 to the tension rod 124.

The rubber section 132 has an annular groove 142 fitted with a mounting hole portion 141 formed in the support member 121, a rod insertion hole 143 having the tension rod 124 inserted therethrough, a hand-drum-shaped portion 146 shaped like a Japanese traditional hand drum or sandglass, and a cylindrical portion 147 located farther from the distal end of the tension rod 124 than the support member 121. The hand-drum-shaped portion 146 has a narrow or neck portion 144 located closer to the distal end of the tension rod 124 than the support member 121.

As the vehicle is accelerated, the tension rod 124 moves axially toward the front of the vehicle (upward in the figure) due to the drive force of the front wheel, so that the cylindrical portion 147 of the rubber section 132 is compressed while the hand-drum-shaped portion 146 is pulled, in the forward direction (upward direction in the figure), by the end cap members 136 secured to one end of the tension rod 124.

On the other hand, as the vehicle is braked, the hand-drum-shaped portion 146 is compressed while the cylindrical portion 147 is pulled in the rearward direction (downward direction in the figure), by the end cap members 137 secured to the tension rod 124.

Figure 11:
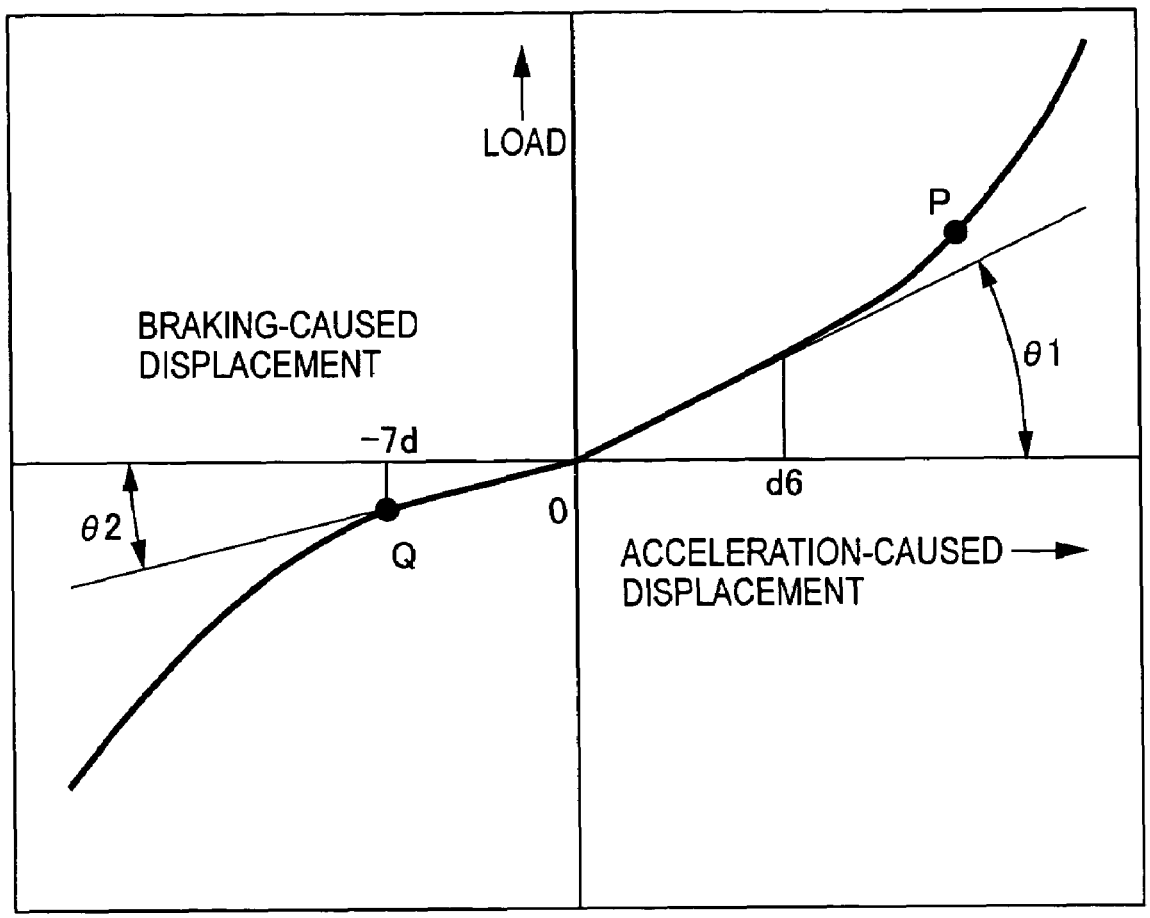
FIG. 11 is a graph showing a load vs. displacement characteristic of a rubber bush member shown in FIG. 10.

FIG. 11 is a graph showing a load vs. displacement characteristic of the rubber bush member 131 shown in FIG. 10, where the vertical axis represents the load while the positive side of the horizontal axis represents the amount of the acceleration-caused displacement and the negative side of the horizontal axis represents the amount of the braking-caused displacement.

In a range where the displacement amount during acceleration is relatively small, the load increases linearly as the absolute value of the displacement amount increases. In a range where the displacement during acceleration is relatively great, the load increases in a nonlinear curve as the absolute value of the displacement amount increases. Let it be assumed that θ1 is an inclination in a range where the displacement amount during acceleration is relatively small, e.g. in the range from zero to d6. "P" represents a point when the throttle valve of the engine is fully opened.

In a range where the absolute value of the displacement amount during braking is relatively small, the absolute value of the load increases linearly as the absolute value of the displacement amount increases. In a range where the absolute value of the displacement amount during braking is relatively great, the absolute value of the load increases linearly as the absolute value of the displacement amount increases in a nonlinear curve. Let it be assumed that θ2 is an inclination in a range where the absolute value of the displacement amount during braking is relatively small, e.g. in the range from zero to −d7 and θ1>θ2.

Namely, the graph of FIG. 11 shows that the spring constant for the displacement during acceleration is greater than the spring constant for the displacement during braking. "Q" represents a point where the vehicle is caused to coast (i.e., travel through inertia) with the throttle valve of the engine fully closed.

The load vs. displacement characteristic of the rubber bush member 131 shown in FIG. 11 can be obtained due to the facts that, during acceleration of the vehicle, the tension rod 124 moves upward in FIG. 10 relative to the support member 121 so that the cylindrical portion 147 is compressed to present a great spring constant, and that, during braking of the vehicle, the tension rod 124 moves downward in FIG. 10 relative to the support member 121 so that the hand-drum-shaped portion 146 is compressed to present a small spring constant.

The above-mentioned load vs. displacement characteristic, i.e. forward/rearward compliance characteristic (characteristic of compliance in the front-and-rear direction of the vehicle), of the rubber bush member 131 is set and applied in a case where the characteristic can not be made linear enough as compared to the load vs. displacement characteristic during acceleration of the vehicle illustrated in FIG. 7. By increasing the spring constant increased for the acceleration-caused displacement, the embodiment can enhance the damping performance. Further, by decreasing the spring constant for the braking-caused displacement, the embodiment can absorb, with increased ease, shocks when the vehicle is caused to coast or gets over a projecting road surface, as well as when the vehicle is braked; thus, the vehicle can achieve an improved ride.

FIGS. 12A and 12B are sectional views showing a vehicular anti-vibration structure in accordance with a sixth embodiment of the present invention. Specifically, FIG. 12A shows the suspension bushing 23 (FIG. 3) before predetermined assembly, and FIG. 12B shows the suspension bushing 23 (FIG. 3) after the predetermined assembly. Namely, FIG. 12B shows that the inner cylindrical portion 51 is displaced toward the first opening section 55 along the above-mentioned line 41 when the suspension bushing 23, having the outer cylindrical portion 52 attached to the lower arm 11 (see FIG. 1), is assembled or fixed to the subframe 10.

Namely, the suspension bushing 23 is fixed to the subframe 10 with the inner cylindrical portion 51 pre-displaced by a predetermined distance D5 from a position of the center point 38F of the cylindrical portion 51 before the assembly to a position of the center point 38G of the cylindrical portion 51 after the assembly.

Thus, in the suspension bushing 23 duly assembled to the subframe 10 as illustrated in FIG. 12B, the first radial protrusion 63 of the first opening section 55 is resiliently compressed with both of the arcuate bulge portion 66 and base protruding portion 65 pressed against the concave surface 58, so that a relatively great preload is produced in the first opening section 55. With the thus-produced great preload, it is possible to prevent shaky movement of the lower arm 11 and the suspension assembly composed of the lower arm 11.

FIGS. 13A and 13B are sectional views showing a vehicular anti-vibration structure in accordance with a seventh embodiment of the present invention, which particularly show the tension rod 124 connected at its front end to the support member 121 via a rubber bush member 151. Specifically, FIG. 13A shows the tension rod 124 before predetermined assembly, i.e. before it is connected at its rear end to the suspension arm 112 (FIG. 9).

The rubber bush member 151 includes two rubber portions 152 and 153 holding therebetween the support member 121, a collar 154 extending through the rubber portions 152 and 153 and support member 121, and end cap members 156 and 157 abutted against the opposite ends of the collar 154 and secured to the end surfaces of the rubber portions 152 and 153 by vulcanization adhesion. Reference numeral 161 represents a nut securing the rubber bush member 151 to the tension rod 124.

Each of the rubber portions 152 and 153 has a middle narrow portion 163 so that it is shaped generally like a Japanese traditional hand drum or sandglass. Thus, each of the rubber portions 152 and 153 is mounted in place with a slight initial interference.

FIG. 13B shows the tension rod 124 after predetermined mounting of the rubber bush member 151, i.e. after it is connected at its rear end to the suspension arm 112 (FIG. 9). Namely, the tension rod 124 is connected at its rear end to the suspension arm 112 with given pre-displacement (i.e., upward pre-displacement in the figure), and thus one of the axial ends 151a of the rubber bush member 151, i.e. the end surface of the end cap member 157, is at a position displaced a predetermined distance D7 from the position illustrated in FIG. 13A. Thus, in this state, the rubber portion 152 is pulled by the end cap member 156 while the other rubber portion 153 is compressed, which produces a preload in the tension rod 124 in a direction of arrow E. When the vehicle is accelerated, the rubber portion 153 is further compressed from the position of FIG. 13B, and the rubber portion 152 is further pulled by the end cap member 156. Conversely, when the vehicle is braked, the rubber portion 153 is pulled from the position of FIG. 13B by the end cap member 157, and the rubber portion 152 is compressed.

Therefore, similarly to the sixth embodiment of FIGS. 12A and 12B, the seventh embodiment can prevent shaky movement of the suspension assembly including the tension rod 124, by virtue of the above-mentioned preload.

Figure 14B:
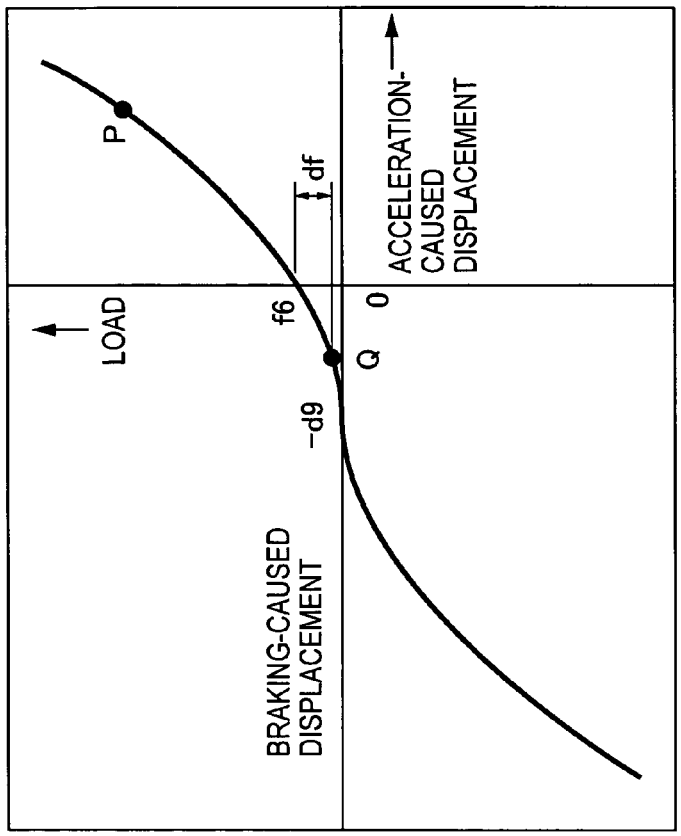
FIGS. 14A and 14B are graphs showing load vs. displacement characteristics of the rubber bush member shown in FIGS. 13A and 13B.
Figure 14A:
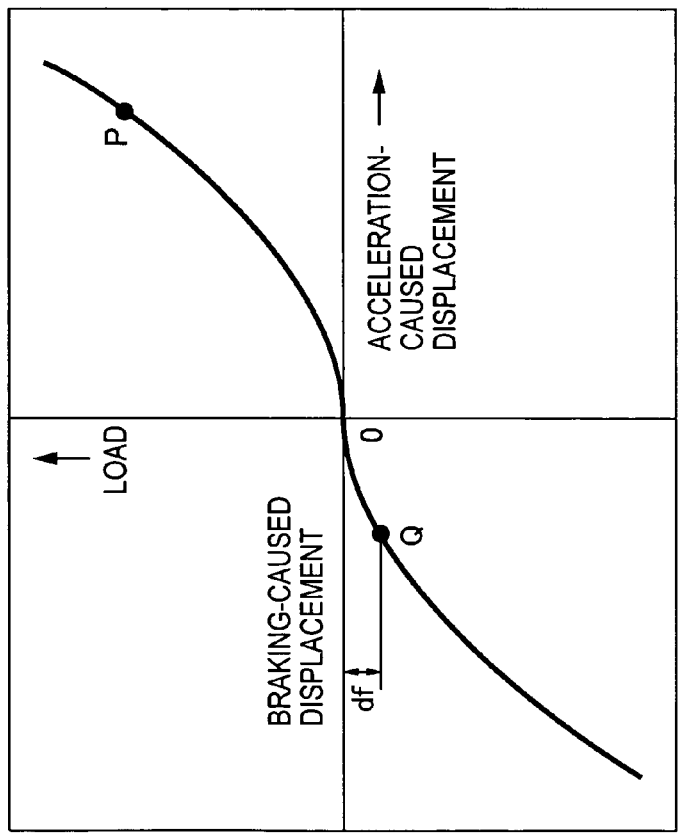

FIGS. 14A and 14B are graphs showing load vs. displacement characteristics of the rubber bush member 151 shown in FIGS. 13A and 13B, where the vertical axis represents the load while the positive side of the horizontal axis represents the amount of the acceleration-caused displacement and the negative side of the horizontal axis represents the amount of the braking-caused displacement.

The load vs. displacement characteristic curve of the rubber bush member 151 before predetermined assembly, shown in FIG. 14A, passes the origin point, and the characteristic curve portion for the acceleration-caused displacement and the characteristic curve portion for the braking-caused displacement are substantially symmetrical with each other about the origin point. In this case, df represents a load at the "Q" point where the vehicle is caused to coast (i.e., travel through inertia) with the throttle valve of the engine fully closed.

According to the load vs. displacement characteristic curve of the rubber bush member 151 after the predetermined assembly, shown in FIG. 14B, a preload f6 is produced when the displacement is zero, and the load becomes zero when the braking-caused displacement amount is −d9. The load vs. displacement characteristic curve of FIG. 14B substantially corresponds to one obtained by translating the vertical axis of the graph of FIG. 14A rightward along the horizontal axis. In this case, a positive load (f6−df) is produced at the "Q" point; because of the positive load, it is possible to minimize shocks or impacts during switching between the acceleration and the braking, even when the vehicle is caused to switch from an accelerated state to a decelerated state to coast (i.e., travel through inertia) with the throttle valve of the engine fully closed.

Such load vs. displacement characteristics are applied in cases where a forward/rearward compliance characteristic of the rubber bush member 151 can not be made linear enough due to limitations of space, cost, etc. and the spring constant of the compressed region can not be made greater than the spring constant of the pulled region.

FIG. 15 is a graph showing a load vs. displacement characteristic of a vehicular anti-vibration structure in accordance with an eight embodiment of the present invention, where the vertical axis represents the load while the positive side of the horizontal axis represents the amount of the acceleration-caused displacement and the negative side of the horizontal axis represents the amount of the braking-caused displacement.

According to this embodiment, the load vs. displacement characteristic becomes linear in an entire range of the acceleration-caused displacement and in part of a range of the braking-caused displacement. Namely, an invariable spring constant can be achieved in a range of the braking-caused displacement from −d11 to zero, as well as in the entire acceleration-caused displacement range. f8 represents a load when the displacement is zero, i.e. a preload. Further, the load vs. displacement characteristic varies in a nonlinear, curved line in a part of the braking-caused displacement range leftward of −d11.

Generally, when the vehicle is caused to coast with the throttle valve of the engine fully closed, a load is applied to the rubber bush members in the same direction as the load applied during braking. Therefore, when, for example, the throttle valve has been switched from the fully-closed position to the fully-opened position, it is preferable that the load vs. displacement characteristic be made linear even in the braking-caused displacement range. For this reason, forward/rearward vibration of the vehicle can be minimized effectively, if arrangements are made such that the load vs. displacement characteristic is made linear and the spring constant increases in a part of the braking-caused displacement range rightward of −d11 past the "Q" point. Such a load vs. displacement characteristic can be achieved, for example, by use of the suspension bushing 100 illustrated in FIG. 8C.

It should be noted that, whereas the above description has been made in relation to only one of the front wheels and tension rods, the same description applies to components pertaining to the other front wheel and tension rod.

It should also be appreciated that the vehicular anti-vibration structure of the present invention is particularly suitable for suspension of vehicles, such as three-wheelers and four-wheelers.

Obviously, various minor changes and modifications of the present invention are possible in the light of the above teaching. It is therefore to be understood that within the scope of the appended claims the invention may be practiced otherwise than as specifically described.

What is claimed is:

1. A vehicular anti-vibration structure for use with a vehicle, the structure comprising,
   a suspension arm supporting a drive wheel;
   a vehicle-body-side member; and
   a suspension bushing disposed in a connection between said suspension arm and said vehicle-body-side member and including:
   a body-side bushing member attached to said vehicle-body-side member;
   an arm-side bushing member attached to said suspension arm; and
   a resilient member joining said body-side bushing member and said arm-side bushing member,
   wherein said resilient member comprises:
   a first aperture having a first concave surface opposite a second concave surface, and a second aperture having a first concave surface opposite a second concave surface;
   a radial protrusion of said first aperture extending from said second concave surface of said first aperture toward said first concave surface of said first aperture, and a radial protrusion of said second aperture extending from said second concave surface of said second aperture toward said first concave surface of said second aperture and away from said radial protrusion of said first aperture,
   wherein said radial protrusion of said first aperture extends further than said radial protrusion of said second aperture; and
   at least one base end portion extending from said second concave surface of said first aperture toward said first concave surface of said first aperture.

2. The vehicular anti-vibration structure according to claim 1, wherein an arcuate top region of said radial protrusion of said first aperture contacts said first concave surface of said first aperture when the vehicle is accelerated.

3. The vehicular anti-vibration structure according to claim 1, wherein said at least one base end portion includes a first base portion and a second base portion.

4. The vehicular anti-vibration structure according to claim 3, wherein said first base portion abuts a first end of said radial protrusion and said second base portion abuts a second end of said radial protrusion.

5. The vehicular anti-vibration structure according to claim 1, wherein said radial protrusion of said first aperture extends further from said second concave surface of said first aperture toward said first concave surface of said first aperture than said at least one base end portion.

6. The vehicular anti-vibration structure according to claim 1, wherein a region of said resilient member that receives a load during acceleration of the vehicle has greater spring constant than another region of said resilient member that receives a load during braking of the vehicle.

7. The vehicular anti-vibration structure according to claim 1, wherein a region of said resilient member that receives a load during acceleration of the vehicle has a more linear load vs. displacement characteristic curve in a predetermined value range of the load during acceleration than another region of said resilient member that receives a load during braking of the vehicle.

8. The vehicular anti-vibration structure according to claim 1, wherein said suspension bushing is mounted to the vehicle with a previous positional displacement in a direction of a load received during acceleration of the vehicle.

9. The vehicle anti-vibration structure according claim 1, wherein a region of said resilient member that receives a load during acceleration of the vehicle includes a spring constant having at least two steps.

10. The vehicle anti-vibration structure according to claim 1, wherein said radial protrusion of said second aperture includes a flat top portion.

11. The vehicle anti-vibration structure according to claim 1, wherein said radial protrusion of said second aperture includes an arcuate top portion.

* * * * *